US006889137B1

(12) United States Patent
Rychlak

(10) Patent No.: US 6,889,137 B1
(45) Date of Patent: May 3, 2005

(54) NAVIGATION METHOD AND NAVIGATION SYSTEM FOR MOTOR VEHICLES

(75) Inventor: Stefan Rychlak, Ilsede (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/048,762

(22) PCT Filed: Jul. 18, 2000

(86) PCT No.: PCT/DE00/02320

§ 371 (c)(1),
(2), (4) Date: Jul. 25, 2002

(87) PCT Pub. No.: WO01/08120

PCT Pub. Date: Feb. 1, 2001

(30) Foreign Application Priority Data

Jul. 24, 1999 (DE) .......................... 199 34 862

(51) Int. Cl.$^7$ ............................................. G08G 1/123
(52) U.S. Cl. ...................... 701/209; 701/207; 701/208; 340/286.07; 340/287; 342/457
(58) Field of Search ............................... 701/209, 200, 701/202, 204, 206, 207, 208, 213, 24; 702/5; 340/286.05, 286.06, 286.07, 287; 342/457

(56) References Cited

U.S. PATENT DOCUMENTS

| 5,057,835 A | 10/1991 | Factor et al. .......... 340/995.27 |
| 5,334,974 A | 8/1994 | Simms et al. ............... 340/990 |
| 5,568,390 A | 10/1996 | Hirota et al. ............... 701/201 |
| 5,570,100 A | 10/1996 | Grube et al. ................ 342/457 |
| 5,867,110 A | * 2/1999 | Naito et al. ............. 340/286.05 |
| 6,028,537 A | * 2/2000 | Suman et al. ................ 340/988 |
| 6,574,561 B2 | * 6/2003 | Alexander et al. ............. 702/5 |

FOREIGN PATENT DOCUMENTS

| DE | 34 45 448 | 7/1985 |
| DE | 41 22 398 | 1/1993 |
| DE | 44 24 735 | 2/1996 |
| DE | 195 16 649 | 11/1996 |
| DE | 195 28 099 | 2/1997 |
| DE | 297 23 427 | 8/1998 |
| DE | 199 34 865 | 2/2001 |
| EP | 0 703 432 | 3/1996 |
| EP | 0 875 729 | 11/1998 |
| EP | 0 995 973 | 9/1999 |
| JP | 07-065290 | 3/1995 |
| WO | WO 93/05492 | 3/1993 |
| WO | WO 95/04340 | 2/1995 |
| WO | WO 95/25649 | 9/1995 |
| WO | WO 98/35311 | 8/1998 |
| WO | WO 00/07165 | 2/2000 |

* cited by examiner

Primary Examiner—Thomas G. Black
Assistant Examiner—Arthur D. Donnelly
(74) Attorney, Agent, or Firm—Kenyon & Kenyon

(57) ABSTRACT

Navigation method and navigation system for motor vehicles for navigating from a present location to a destination. In response to an emergency user request, an emergency destination closest to the present location is selected from a database, set as the destination, and a route calculated from the present location to the emergency destination. The navigation system includes a memory having a database for emergency destinations and a device for selecting, from the database, an emergency destination closest to the present location.

21 Claims, 1 Drawing Sheet

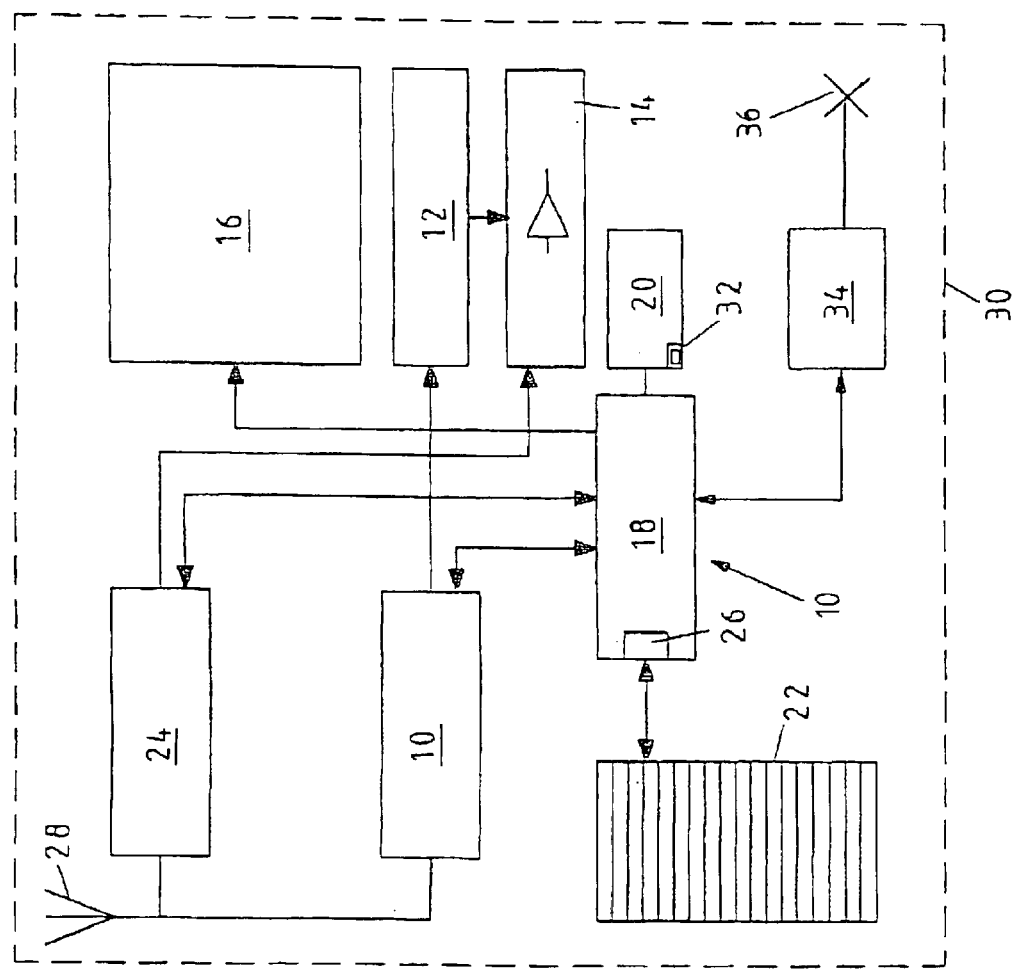
Fig.

NAVIGATION METHOD AND NAVIGATION SYSTEM FOR MOTOR VEHICLES

FIELD OF THE INVENTION

The present invention relates to a navigation method and a navigation system for motor vehicles for navigating from a present location to a destination.

BACKGROUND INFORMATION

In means of conveyance, such as motor vehicles, airplanes or ships, permanently installed navigation systems quickly, easily and reliably guide the driver of the means of conveyance from a present location to a desired destination without requiring the driver of the means of conveyance to go to the trouble of planning a route and obtaining the appropriate maps ahead of time. For this purpose, navigation data based on, for example, charts, geographic maps or road maps are stored in the navigation system, for example on CD-ROM. The navigation system uses, for example, a global positioning system (GPS) to determine a present location and calculate navigation instructions that lead to a predetermined destination. The navigation data preferably includes information about roads and routes for motor vehicles.

However, before the navigation system can perform its function and calculate a route from the starting location to the destination, a user enters the desired destination and, in non-GPS navigation systems, possibly the present location as well. This is done, for example, using a manual input device, with the user having to sequentially retrieve or scroll to, and then select, letters in a character table until the selected letters and numbers form, for example, a city name, a street name and a house number of the destination or starting location. However, this is both complicated and time-consuming and requires a certain amount of basic skill in operating the navigation system. This input also takes a certain amount of time, which can be especially disadvantageous if the user is having an emergency in an unknown area and must quickly reach, for example, a hospital or police station. The need to first laboriously determine the location, for example, of the nearest hospital and program the navigation system to calculate a route to this nearest hospital takes up valuable time. Furthermore, it has been frequently observed that people involved in emergencies and suffering from the associated stress, often are no longer capable of remembering generally known emergency medical numbers (112 or 19222) and are certainly no longer able to enter information quickly and correctly into the navigation system. In such extraordinary circumstances, a person involved in an emergency in familiar surroundings often can no longer easily recall even a normally well known route to the nearest hospital.

SUMMARY OF THE INVENTION

An object of the present invention is to provide an improved method and an improved device of the type mentioned above which overcome the above-mentioned disadvantages and provide a user with optimum support even at times of elevated stress in emergency situations.

According to the present invention, this is accomplished with a navigation method of the type mentioned above by selecting, in response to an emergency request by the user, an emergency destination closest to the present location from a database, setting it as the destination and calculating a route from the present location to the emergency destination.

This has the advantage that, in an emergency, the navigation system can provide valuable assistance in directing the user to the nearest emergency destination, for example a hospital, a fire station or a police station, without time consuming input or programming work. This adds an important additional route selection function to the functionality of a navigation system.

At the request of the user, different types of emergency destinations are suitably offered for selection by the user, with the emergency destinations being, for example, hospitals, police stations, public telephones, emergency shelters, emergency call boxes and/or fire stations.

The user makes an emergency request, for example, by pressing a key for a predetermined period of time lasting, for example, three seconds.

According to an advantageous embodiment of the present invention, after selecting the emergency destination for which the route is calculated, the emergency destination is notified, preferably automatically, of the vehicle's arrival. This gives the emergency destination enough time to prepare for the arrival of the affected vehicle and thus to take any necessary measures. In particular, an emergency room of a hospital, for example, can be selected as an emergency destination and be prepared in good time for the arrival of an accident victim or a patient.

It is also advantageous for the selected emergency destination to provide the driver of the nearing vehicle with a selection of possible or probable diagnoses, from which the vehicle driver can select the one most applicable to his or her situation and have it communicated to the emergency destination. This can further improve efforts by the emergency destination to prepare for the arriving vehicle and provide faster and more specific treatment or care for the vehicle driver or vehicle passengers.

According to the present invention, a navigation system of the type mentioned above is also provided with a memory having a database for emergency destinations and a device for selecting an emergency destination closest to the present location from the database.

According to another advantageous embodiment of the present invention, a communications link to an external database, for example in the form of a service center, is set up via a communications interface, and the selected emergency destination—or the group of emergency destinations offered for selection—is supplied to the navigation system over the communications link. This has the advantage that the latest information about emergency destinations, which is maintained, for example, by the service center, is always available. In addition, at times outside normal business hours, such as at night, over the weekend or on public holidays, the selection of emergency destinations can be limited to only those that actually have an emergency service—in the case of a medical emergency service, for example, the nearest doctor's office offering a weekend emergency service.

A user-friendly operability is achieved by providing a manually operated key to activate the device for selecting an emergency destination closest to the present location. This makes it possible to easily and directly activate the device for selecting an emergency destination closest to the present location.

BRIEF DESCRIPTION OF THE DRAWINGS

The FIGURE shows a schematic block diagram of a preferred embodiment of a navigation system according to the present invention.

DETAILED DESCRIPTION

The preferred embodiment of a navigation system 100 according to the present invention and illustrated in the Figure includes a destination guidance system 10 with acoustic road guidance 12 via a speaker unit 14, a display unit 16 to display, for example; "destination, city, street," a microprocessor 18 with a user interface in the form of a keypad 20, a memory 22 for emergency destinations, a radio receiver 24 that is also connected to speaker unit 14, and an antenna 28 that is connected to both radio receiver 24 and destination guidance system 10. The above-mentioned components are located in or on a motor vehicle identified by reference number 30, which is indicated only by broken lines.

A database of emergency destinations in a digital map base of the navigation system, which represents an actual road grid, is stored in memory 22. Emergency destinations of this type are, for example, hospitals, police stations, public telephones, emergency call boxes and/or fire stations. A device 26 for selecting the emergency destination closest to the present location from the database in memory 22 is integrated into microprocessor 18, for example, in the form of a software module. An emergency key 32 that is activated by operating device 26 is integrated into keypad 20. This emergency key 32 is labeled in an appropriate manner on keypad 20.

To carry out user requests, the user operates keypad 20 manually. The term "user request" in this case refers to an input by the user, such as pressing a key on navigation system 100, this input being intended to activate a predetermined function of navigation system 100. A user request in an emergency, for example a medical emergency, is hereinafter referred to as an "emergency user request." This emergency user request is carried out by manually pressing emergency key 32.

If the user of motor vehicle 30 has an emergency that requires him or her, for example, to drive quickly to the nearest hospital, the user presses the emergency key 32 to generate the "emergency user request." A selection menu then appears on display unit 16, for example, in the following form:

Emergency Destinations:

Nearest hospital

Nearest police station

Nearest fire station

Nearest veterinary office

The user selects "nearest hospital." after which device 26 selects, from memory 22, the hospital that is closest to the present location. The location of this nearest hospital is set as the destination and a route calculated from the present location to the destination. Destination guidance system 10 subsequently guides the user along the route to this nearest hospital via display unit 16 and acoustic announcement unit 12.

This eliminates the need of the user to laboriously select the nearest hospital himself, for example using a map, and then enter this location manually as the destination. All of this is done automatically by navigation system 100.

According to an advantageous embodiment of the present invention, a communications interface 34, in the present case in the form of a mobile telephone that operates according to the GSM, UMTS or a comparable standard, is connected to microprocessor 18. This interface has a transmitting/receiving antenna 36 to transmit and/or receive mobile wireless signals. According to the embodiment, memory 22 contains not only the emergency destinations, but also addresses, in particular, telephone numbers under which the emergency destinations can be reached.

According to the embodiment, when the vehicle driver selects an emergency destination from the database stored in memory 22, a telephone number of the selected emergency destination is output and supplied to communications interface 34, which sets up a communications link to the selected emergency destination on the basis of the telephone number. After the communications link has been set up between the vehicle and emergency destination, the emergency destination is notified of the vehicle's arrival. This notification can include nothing more than simply telling the emergency destination that the vehicle is about to arrive. In addition to this, the selected emergency destination is advantageously notified of the time the vehicle is expected to arrive at the emergency destination.

This time is determined, for example, from the traffic route data stored in memory 22, which includes the average speed values assigned to the route segments, based on the vehicle's present location and the calculated route to the emergency destination.

According to the embodiment, the emergency destination can also provide the vehicle driver with a selection of probable diagnoses (medical diagnoses if, for example, a hospital was selected as the emergency destination) over the established communications link. Like the selection of emergency destinations, the selection of probable diagnoses can also be displayed on display unit 16 so that the vehicle driver can choose, from the list of offered diagnoses, the one that he or she feels is most appropriate to the situation, with this option being subsequently communicated to the selected emergency destination over the communications link.

In addition, or as an alternative, the emergency destination can also obtain a diagnosis, for example, by having a doctor on duty at a hospital selected as the emergency destination talk to the vehicle driver by telephone over the established communications link. Speaker 14 of the navigation system is preferably used for acoustic playback of the voice signals received from the emergency destination via communications interface 34.

Alternatively, if a motor vehicle repair shop is selected as the emergency destination, a remote diagnosis of the vehicle or of important vehicle components can be automatically carried out over the communications link, with important vehicle data, such as coolant temperature, oil level indication, fuel level, etc., which is available in an on-board computer connected to the navigation device according to the present invention, being requested either automatically or by a specialist at the emergency destination.

A further refinement of the present invention concerns an external database from which a selected emergency destination, or multiple emergency destinations provided for selection, is loaded into the navigation system. For this purpose, the navigation system has communications interface 34 described above, which is designed to set up a communications link to the external database.

For this purpose, at least one address, preferable a telephone number, of a service center that manages the external database and updates the data it contains, is stored in the navigation system.

In the event of an emergency user request, communications interface 34 sets up a communications link to the service center, based on the address stored in the navigation system, whereupon an emergency destination is loaded from its database or, according to a preferred embodiment, a multiplicity of selectable emergency destinations are loaded from the database. Vehicle position data is preferably transmitted from the navigation system to the service center, which determines the one or more emergency destinations in the vicinity of the vehicle's location and provides it or them to the navigation system.

The service center maintains the emergency destinations by continuously updating the emergency destination data, in particular information about their availability. For example, the service center enters into the database information about the emergency destination's business hours and any emergency services available outside of business hours, for example a medical weekend emergency service. As a result, only those emergency destinations can be selected which are indeed available at the time of the emergency user request or, according to an advantageous embodiment of the present invention, will be available at the time the vehicle is expected to arrive at the emergency destination. Thus, in the event of a medical emergency over the weekend, for example, only the doctor's offices or hospitals scheduled to provide emergency services on that particular weekend are selected as emergency destinations in response to an emergency user request.

The one or more emergency destinations provided by the service center are loaded into navigation system 100 over the established communications link and used in the manner described above. The loaded emergency destination data advantageously needs to include only the destination locations and, if the user is able to select the destinations, a concise identification of the emergency destination, such as "hospital," "police," "road assistance," or the like.

What is claimed is:

1. A navigation method for a motor vehicle for navigating from a present location to a destination, comprising the steps of:
    selecting an emergency destination closest to the present location from a database in response to an emergency user request;
    setting the emergency destination as the destination; and
    calculating a route from the present location to the emergency destination, wherein the calculating of the route occurs in the vehicle.

2. The navigation method according to claim 1, further comprising the step of:
    in response to the emergency user request, providing different types of emergency destinations for selection by a user.

3. The navigation method according to claim 1, wherein:
    the emergency destination includes at least one of a hospital, a police station, a public telephone, an emergency shelter, an emergency call box, and a fire station.

4. The navigation method according to claim 1, further comprising the step of:
    pressing a predetermined key to activate the emergency user request.

5. The navigation method according to claim 1, wherein:
    wherein the predetermined key is pressed for a predetermined length of time to activate the emergency user request.

6. The navigation method according to claim 5, wherein:
    the predetermined length of time is three seconds.

7. The navigation method according to claim 1, further comprising the step of:
    setting up a communications link over which the emergency destination is notified of an imminent arrival of the motor vehicle to the emergency destination via a communications interface.

8. The navigation method according to claim 7, further comprising the step of:
    notifying the emergency destination of a time the motor vehicle is expected to arrive at the emergency destination.

9. The navigation method according to claim 7, wherein:
    at least one of the motor vehicle and a vehicle driver requests a diagnosis from the emergency destination over the communications link.

10. The navigation method according to claim 1, wherein:
    the database is an external database,
    a communications link is set up to an external database via a communications interface, and
    the emergency destination is selected from the external database.

11. A navigation system for a motor vehicle for navigating from a present location to a destination, comprising:
    a database for emergency destinations;
    a device for selecting, from the database, an emergency destination closest to the present location; and
    an arrangement, provided in the motor vehicle, for calculating a route from the present location to the emergency destination closest to the present location, wherein the calculating of the route occurs in the vehicle.

12. The navigation system according to claim 11, further comprising:
    a memory for storing the database.

13. The navigation system according to claim 11, further comprising:
    an external memory for storing the database; and
    a communications interface for retrieving an emergency destination from the external memory.

14. The navigation system according to claim 11, further comprising:
    a manually operated key for activating the device for selecting in order to determine the emergency destination closest to the present location.

15. The navigation system according to claim 11, wherein:
    the emergency destination closest to the present location includes at least one of a hospital, a police station, a public telephone, an emergency shelter, an emergency call box, and a fire station.

16. The navigation method according to claim 1, further comprising the step of:
    in response to the emergency user request, providing different types of emergency destinations for selection by a user;
    wherein the emergency destination includes at least one of a hospital, a police station, a public telephone, an emergency shelter, an emergency call box, and a fire station.

17. The navigation method according to claim 1, further comprising the steps of:
    setting up a communications link over which the emergency destination is notified of an imminent arrival of the motor vehicle to the emergency destination via a communications interface; and
    notifying the emergency destination of a time the motor vehicle is expected to arrive at the emergency destination.

18. The navigation method according to claim 17, wherein:

at least one of the motor vehicle and a vehicle driver requests a diagnosis from the emergency destination over the communications link.

19. The navigation method according to claim 17, wherein:

the database is an external database, a communications link is set up to an external database via a communications interface, and the emergency destination is selected from the external database.

20. The navigation method according to claim 16, wherein:

the database is an external database, a communications link is set up to an external database via a communications interface, and the emergency destination is selected from the external database.

21. A navigation system for a motor vehicle for navigating from a present location to a destination, comprising:

a database for emergency destinations;

a selecting device to select from the database an emergency destination closest to the present location;

a determining arrangement to determine a route from the present location to the emergency destination closest to the present location;

an external memory to store the database;

a communications interface to retrieve an emergency destination from the external memory; and a manually operated key to activate the selecting device to determine the emergency destination closest to the present location;

wherein the calculating of the route occurs in the vehicle.

* * * * *

UNITED STATES PATENT AND TRADEMARK OFFICE
CERTIFICATE OF CORRECTION

PATENT NO. : 6,889,137 B1
DATED : May 3, 2005
INVENTOR(S) : Stefan Rychlak

It is certified that error appears in the above-identified patent and that said Letters Patent is hereby corrected as shown below:

Column 7,
Line 14, change "according to claim 16," to -- according to claim 1, --.

Signed and Sealed this

Thirtieth Day of August, 2005

JON W. DUDAS
*Director of the United States Patent and Trademark Office*